J. H. STALEY.
AUTO AMBULANCE TRUCK.
APPLICATION FILED NOV. 24, 1919.
1,350,527.
Patented Aug. 24, 1920.
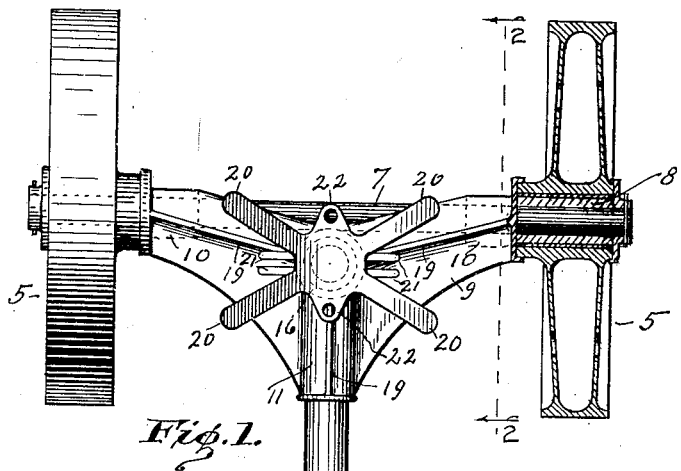
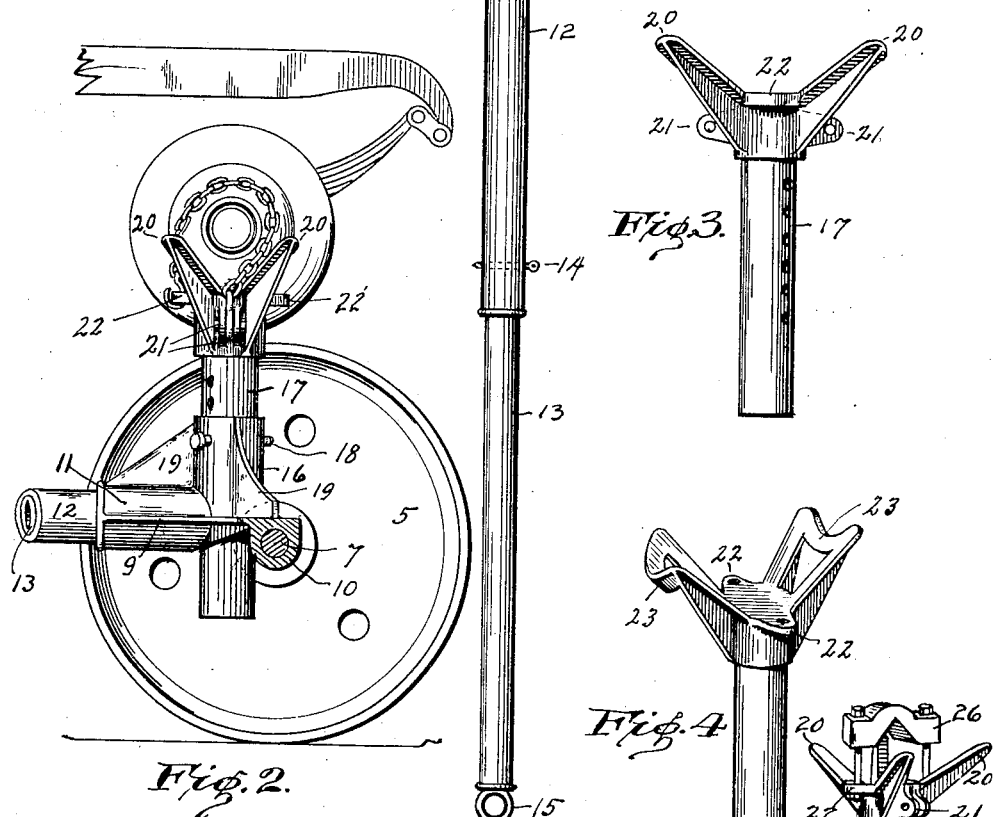
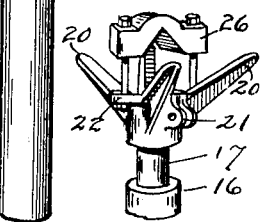
Inventor;
Joseph H. Staley,
By Joseph A. Minturn,
Attorney.

UNITED STATES PATENT OFFICE.

JOSEPH H. STALEY, OF COLUMBUS, INDIANA.

AUTO-AMBULANCE TRUCK.

1,350,527.      Specification of Letters Patent.      Patented Aug. 24, 1920.

Application filed November 24, 1919. Serial No. 340,373.

*To all whom it may concern:*

Be it known that I, JOSEPH H. STALEY, a citizen of the United States, residing at Columbus, in the county of Bartholomew and State of Indiana, have invented a new and useful Auto-Ambulance Truck, of which the following is the specification.

The object of this invention is to provide a wheeled device for insertion under automobile and motor-truck axles on machines of which the traction-wheels, axles, and other parts have been so broken down by accident that they cannot be moved on their own wheels.

A further object is to provide a device that will be sufficiently durable to withstand the hard usage of rapid transit over bad roads, going to the machine in distress, as well as a device that will stand up under a heavy load on the return trip.

The object, also, is to provide a simple device, easy to operate, and adapted for use under either front or rear axle, in the middle, or at either side of the latter.

The above, and other objects which will hereinafter appear, are accomplished by the mechanism illustrated in accompanying drawings wherein like characters of reference indicate like mechanical parts:

Figure 1 is a top plan view, and partial horizontal section, of my complete invention.

Fig. 2 is a vertical section on the line 2—2 of Fig. 1, showing same in operative position under an automobile rear axle.

Fig. 3 is a front view of the saddle removed from the rest of the machine.

Fig. 4 is a perspective view of a modified form of saddle.

Fig. 5 is a perspective view of the saddle and clamp for holding the front axle.

A pair of wheels 5, 5, of any strong, durable construction, here shown as cast-iron, double disk wheels, are mounted on a wrought steel axle 7, having a skein 8. A cast body has a horizontal plate 9 with depending blocks 10, 10, cast around the axle to secure the latter to the body. The plate also has an integral, horizontal sleeve 11, in which a tongue 12 is inserted and fastened by means of a pin or in any secure manner, not shown. The tongue is preferably tubular and has an outer telescoping member 13, by which the tongue as an entirety may be varied in length. The parts have registering holes through which a retaining-pin 14, is placed and the outer member preferably terminates with an eye 15.

The plate 9, also has a hollow integral standard 16, in which a telescoping pipe 17 is placed. The pipe has transverse holes to receive a pin 18, inserted through registering holes in the standard 16. Flanges 19, from plate 9 to the standard 16, strengthen the latter. It will be noted that the plate 9 is largely in advance of the axle, and the standard opening entirely so, which causes the pipe 17, to miss the axle.

Securely fastened to the top of the pipe 17, is a saddle having four upwardly, oblique horns 20, preferably in pairs, the members of which are closer to each other than to the horns of the other pair, the better to fit the housings and usual irregular axle formations.

Between the two members of each pair of horns is a pair of ears 21, with transverse openings for the attachment of chains for fastening the truck or automobile axles to the saddle, and ears 22, 23, are also provided between the pairs of horns for attaching bolts that hold the clamp 26.

The operation of my invention is as follows: The damaged machine is hoisted to normal position or a little higher, by the aid of a lifting-jack, then my improved truck, with its saddle sufficiently lowered is rolled under with the saddle immediately under the axle of the damaged wheel, or other part, and the tongue extending forward. The saddle is then raised against the axle of the damaged machine, in which elevated position the saddle is retained by pin 18. Then the axle is chained or clamped to the saddle in the maner shown in Fig. 2 or in any secure way, and the tongue is made fast to a tow-line, after being lengthened by drawing out the telescoping members if the truck is chained to a rear axle, or shortened by a reverse operation if chained to a front axle. The end of the tongue is chained to the machine so it will not drop down when the tow-line is slack.

In the modification shown in Fig. 4, the horns of each pair, in the saddle, are connected by a downwardly curved bar 23, to afford a different axle-support and means for applying the securing chain, which, will be advantageous under some circumstances.

Having thus fully described my invention, I claim:

1. The combination with a wrecking truck, of a saddle having four radial upwardly disposed horns to support the axle of a wrecked car, tie-chain attaching formations between horns on opposite sides of the saddle, and clamp attaching formations on the saddle between the chain-attaching ones.

2. In a wrecking truck, a one-piece cylindrical wrought axle; a pair of wheels loosely mounted on the axle; a body comprising horizontal plates with integral depending blocks cast rigidly to the axle, said body having a standard integral with and above said horizontal plates with a vertical opening in the standard in front of the axle; a pipe vertically adjustable in the standard; means above the horizontal plates for holding a given adjustment; a saddle with a plurality of radial horns oblique to a plane in the axis of the pipe parallel with the axle of the truck fixed on the pipe; said body having an integral and substantially horizontal hollow member in front of the axle; and a tongue in a plurality of telescoping sections fastened in said horizontal hollow member.

3. In an auto-wrecking truck, a one-piece wrought axle; a pair of wheels mounted on the axle; a body comprising horizontal plates with depending blocks cast on the axle, said body having a standard integral with and above said horizontal plates with a vertical opening in the standard laterally of the axle; a pipe vertically adjustable in the standard; means above the horizontal plates for holding a given adjustment; a saddle with a plurality of oblique horns fixed on the pipe; and a tongue secured to the body.

In witness whereof I have hereunto set my hand at Columbus, Indiana, this 18th day of November, 1919.

JOSEPH H. STALEY.